May 24, 1927.

J. F. KERLIN ET AL 1,629,875

PIGTAIL CONNECTION FOR BRUSHES

Filed April 20, 1921

INVENTORS
J. F. Kerlin
BY H. J. Rosenthaller
A. C. Nolte
their ATTORNEY

May 24, 1927. 1,629,875
J. F. KERLIN ET AL
PIGTAIL CONNECTION FOR BRUSHES
Filed April 20, 1921  2 Sheets-Sheet 2

INVENTORS,
J. F. Kerlin
H. J. Rosenloffer
BY
their ATTORNEY

Patented May 24, 1927.

1,629,875

UNITED STATES PATENT OFFICE.

JOHN F. KERLIN AND HENRY J. ROSENHOFFER, OF BRADFORD, PENNSYLVANIA, ASSIGNORS, BY MESNE ASSIGNMENTS, TO NATIONAL CARBON COMPANY, INC., OF NEW YORK, N. Y., A CORPORATION OF NEW YORK.

PIGTAIL CONNECTION FOR BRUSHES.

Application filed April 20, 1921. Serial No. 462,945.

This invention relates to methods of and means for securing electrical conductors of the type commonly called pig-tails to brushes of the character used for collecting or delivering electric currents to the rotating elements of dynamo-electric machines. It is particularly concerned with brushes which are wholly or partly constructed of material which is sufficiently malleable to flow when hammered.

It is proposed in the present invention to secure the pig-tail to the brush by introducing the same into an opening formed in the brush and thereupon, by hammering or in other suitable manner, causing the material surrounding the pig-tail to flow into intimate engagement therewith, so as to firmly secure the pig-tail in the brush. An electrical contact of extraordinarily low resistance and permanency is thus produced at a low cost of manufacture.

A good understanding of the invention may now be had from the following description of certain specific methods of and means for practicing the same, reference being had to the accompanying drawings in which:—

Similar characters of reference designate similar parts in each of the several views.

Figure 1:
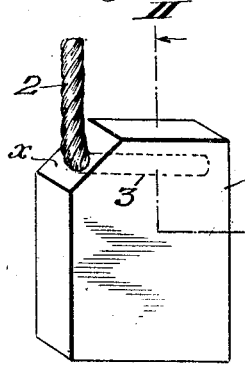
Figure 1 shows a brush with the pig-tail before the same is secured in the brush.
Figure 2:
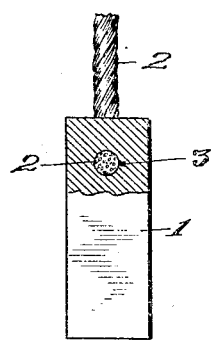
Figure 2 is a section of Figure 1, taken in line II—II, looking in the direction of the arrow.
Figure 3:
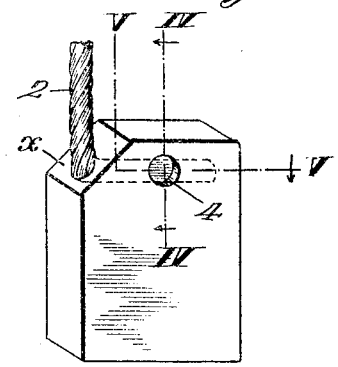
Figure 3 is a view showing the brush of Figure 1 after the pig-tail has been secured therein, in accordance with the method of the present invention.
Figure 4:
Figures 4 and 5 are views showing sections of Figure 3, taken on lines IV—IV and V—V, looking in the direction of the arrows.
Figure 5:
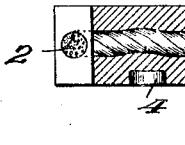

In Figure 1 of the drawing, reference numeral 1 designates a brush composed of a mixture of copper and graphite, this brush being commonly known in the art as of the metal-graphite type. A stranded metal conductor or pig-tail 2 is shown inserted into a hole 3 parallel to the face of the brush, the diameter of the hole being such that the pig-tail substantially fills the same, as indicated in Figure 2. To secure the pig-tail in the hole, the operator hammers a portion of the face of the brush so that a depression 4 is formed therein, the material of the brush owing to its malleability being driven inwardly so as to compress the pig-tail adjacent the depression tightly between the walls of the hole. The circular cross-section of the pig-tail is thus changed to an elliptical one at the point of compression, as indicated in Figure 4 and the walls of the passage are bent, as shown in Figure 5, owing to the force of compression which radiates from the depression 4 and causes the brush material to flow in said direction. These deformations of the pig-tail, both in cross-section and across its axis, serve to augment the purely compressive forces in securing the pig-tail in the brush.

The compression and flow of the brush material may be brought about as hereinbefore stated, in any suitable manner, as by an ordinary hammer, in which case a flat faced punch is preferably employed to form the depression 4, or, still better, by an oscillatory or vibrating mechanism, such as an automatic hammer or power-driven oscillating punch or tamping device, which may be operated electrically or pneumatically or in any other suitable manner, as will be readily understood. Such a mechanism is preferable, because it operates by a rapid succession of comparatively light taps, so that the compression and flow of the brush material is achieved, not only rapidly, but with the least danger of fracture.

Figure 6:
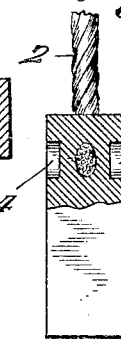
Figure 6 is a view similar to Figure 4, but showing a modification of the invention.

Instead of forming the depression on one side only, it may be formed on both sides, if the brush is sufficiently thin, as indicated at 4 and 4ª in Figure 6.

Figure 7:
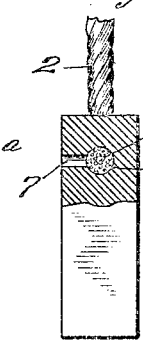
Figures 7, 9, 11 and 13 are views similar to Figure 2 showing modifications.
Figure 8:
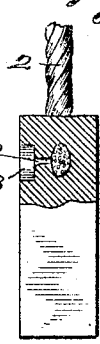
Figures 8, 10, 12 and 14 are views similar to Figure 4 showing modifications, these views corresponding respectively to Figures 7, 9, 11 and 13.
Figure 9:
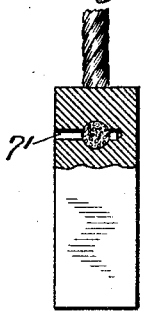
Figure 10:
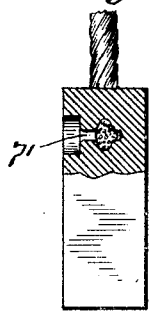
Figure 11:
Figure 12:
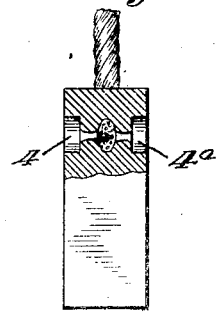

When the brush is rather thick, a hole 7 may first be formed therein (Fig. 7), which hole intersects the passage 3 and extends through the brush material in the direction in which the compressive force is to be applied. The depression 8 is then hammered into the material in the above-described manner, with the result that the material flows into intimate contact with the pig-tail and partially or wholly closes the opening 7, as illustrated in Fig. 8. The hole 7 serves to prevent fracture of the brush material and is particularly useful when the pig-tail is comparatively far under the surface of the brush. The hole may extend beyond the pig-tail passage as indicated at 7′ in Figs. 9 and 10, or clear through the brush as indicated in Figs. 11 and 12, in which case the depressions 4 and 4ª are formed on both sides, so that the pig-tail is compressed by forces from both directions.

Figure 13:
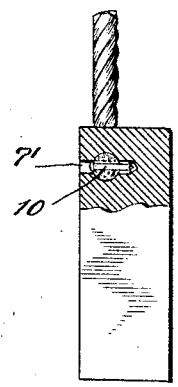
Figure 14:
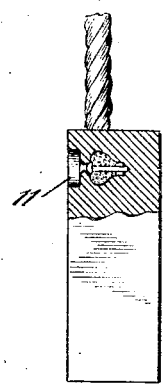

Still greater security of connection may be attained by the method illustrated in Figures 13 and 14. In this case a small pin or nail 10 is inserted in hole 7′ and driven through the pig-tail 2. The brush material is then hammered in the manner above described to form the depression 11, Fig. 14. This operation has the effect of driving the pin further into the brush and of causing the material to flow over the head of the pin, so as to securely lock the same in position. The pig-tail is thus distorted substantially as indicated in Fig. 14 and is held in the brush with extraordinary security.

Figure 15:
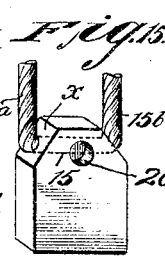
Figure 15 is a perspective view showing one method of leading the pig-tail into the brush.
Figure 16:
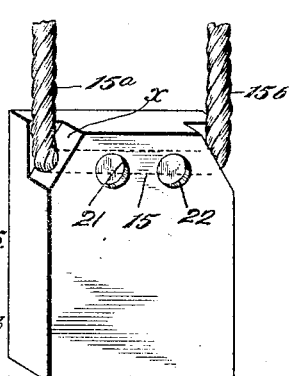
Figures 16, 17, 18 and 19, are views similar to Figure 15, showing modifications thereof.

Figures 15 and 16 show brushes in which the conductors 15 are placed into passages which extend clear through the brushes, so that the ends of the conductors form two pig-tails 15ª and 15ᵇ. The middle portion of each conductor is secured in the brush by means of compression, either at a single point, as indicated at 20 in Fig. 15, or at a plurality of points, as indicated at 21 and 22 in Fig. 16.

Figure 17:
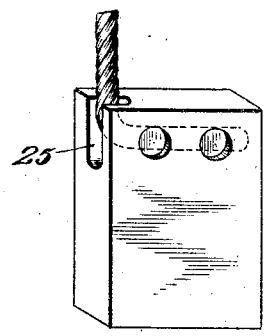
Figure 18:
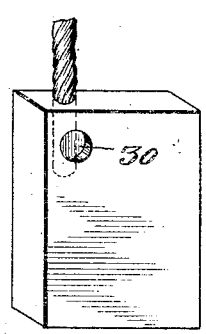
Figure 19:
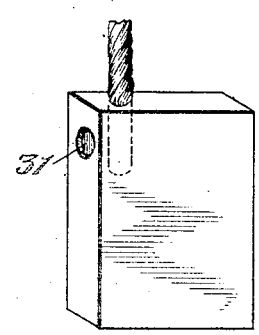
Figure 20:
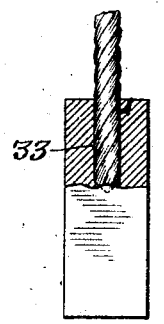
Figures 20 and 21 are views illustrating a modified manner of securing the pig-tail in the brush.

The pig-tail may be led into the brushes, either at beveled faces *x* as illustrated in Figs. 1, 3, 15 and 16, in which latter case the bevel extends only partially across the side of the brush, or it may be brought in through a groove such as 25, Fig. 17, or directly into the flat brush surface as in Figs. 18 and 19, in the former of which it is secured by compressive force applied to the broad face, as at 30, and in the latter of which it is secured in similar manner by hammering applied to an end face as at 31. Many other methods of leading in the pigtails will readily suggest themselves to those skilled in the art.

Figure 21:

In the preceding embodiment of the invention, the compressive force has been described as being applied to the brush in a direction substantially at right angles to that of the pig-tail. A modification of this is illustrated in Figs. 20 to 23, inclusive, in which the force is applied in a direction parallel to the pig-tail. In this manner of practicing the invention, the brush is formed with a hole 33 and a pig-tail of substantially the same diameter is inserted therein. The material about the hole is then hammered down, as by a hollow punch which is slipped over the pig-tail, so as to form a depression 35 about the pig-tail. By the hammering the brush material is caused to flow into intimate engagement with the pig-tail, as illustrated in Fig. 21, thus forming an excellent electrical contact. The walls of the openings 33, moreover, are caused to converge toward the top, thus serving to lock the pig-tail securely in the brush.

Figure 22:
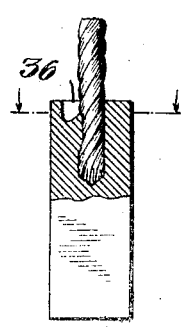
Figure 22 is a view similar to Figure 21 showing a modification.
Figure 23:
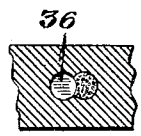
Figure 23 is a view showing a section of Figure 22, taken on the dot-and-dash line, looking in the direction of the arrows.

Instead of applying the force concentrically to the pig-tail, it may be applied only at a side, as illustrated in Figs. 22 and 23, wherein 36 designates the depression formed by the compression. The punch or other instrument by means of which the depression is formed may be held at slight angle to the direction of the pig-tail, so that the maximum force is applied in the direction in which the material is to be caused to flow.

It will be observed that although in certain of its aspects the invention is applicable to malleable brushes in general, it is particularly well adapted to brushes possessing only a limited degree of malleability, such as metal-graphite composition brushes, which, as well known in the art, are composed principally of finely divided copper and graphite, these materials, together with a suitable binder, being consolidated by a well-known process into a malleable composition. In accordance with this invention the pigtail is retained in a brush of this character by material which has been displaced from its original position in the consolidated composition and forced into intimate contact with the pigtail.

It will also be noted that another feature of the invention resides in the fact that the material, when subjected to the force of compression, is sustained or confined laterally to prevent fracture or crumbling thereof, this being accomplished in the preferred forms of embodiment herein particularly described by subjecting only a limited portion of a face of the brush to the compressive force, so that the surrounding material serves to provide the desired lateral support.

Although the invention is herein illustrated and described with reference to only certain specific forms of embodiment thereof, it will be readily understood that the invention is not thus limited, and that many changes and modifications may be made therein, it being intended to claim the invention broadly, in whatever form its principle may be embodied.

What is claimed is:

1. The method of connecting a conductor securely and in intimate conductive contact with a frangible brush of limited malleability having an opening therein to receive the conductor, which consists in placing a portion of the conductor in the opening and permanently deforming a portion of the brush material into compact engagement with the conductor, by applying compressive force to a portion of the brush material of limited area which is situated to be sustained on all sides by other material of the brush not directly subjected to the compressive force, whereby fracture or crumbling of the brush during such operation of compression is avoided.

2. The method of securing a compressible conductor in an opening in a malleable brush, which consists in forming a hole in the brush in a direction at an angle to said opening, and displacing a limited portion of the brush material surrounding said hole inwardly to produce intimate engagement of the wall of the opening with said conductor.

3. The method of securing a flexible conductor in an opening in a malleable brush, which consists in forming a hole in the brush in a direction at an angle to said opening, inserting a pin in said hole and causing the same to extend into said conductor, and displacing a limited portion of the brush material surrounding said hole inwardly so as to flow over the head of the pin and produce intimate engagement of the wall of the opening with said conductor.

4. The method of securing a flexible conductor in a malleable brush, which consists in providing the brush with two outwardly-opening intersecting holes, inserting the conductor in one hole and then inserting a pin in the other hole and causing the same to extend into said conductor, and displacing brush material in the direction transverse of the axis of one of said holes to produce intimate engagement of said material with said conductor.

5. The method of securing a flexible conductor to a malleable brush which consists in providing an opening in a portion of the brush removed from its wearing face, said opening extending through the brush material and being closer to one side face thereof than to the opposite face, introducing a flexible conductor into said opening, and inwardly displacing only a limited portion of the brush material constituting said closer side face to cause intimate engagement of the walls of the opening with said conductor.

6. In combination, a brush composed of finely divided material consolidated into a malleable composition, a conductor extending into said brush and retained therein by material of the brush which has been displaced from its original position in the consolidated composition and forced into intimate contact with the conductor, and a pin passing through said displaced brush material and extending into said conductor.

7. In combination, a brush, a conductor extending into said brush, said brush comprising material of a malleability substantially below that of malleable metals compressed against said conductor and said conductor having at a point intermediate its ends a restriction formed by the pressure of said material, and a pin extending through said compressed brush material and the conductor.

8. In combination, a metal-graphite composition brush having an opening and a conductor extending into said opening, the face of the brush being provided with a recess extending toward said opening, the wall of said opening being provided with a projection adjacent the said recess, said projection serving to engage intimately the conductor and to secure the same in the opening, the said recess being at least partially closed adjacent its inner end by material displaced from the face of the brush in the formation of said projection.

9. In combination, a brush, a conductor extending thereinto and frictionally retained therein by compressed brush material, and a pin extending through said compressed brush material and conductor to augment the security of said connection, said pin being retained in place by the brush material compressed against said pin.

10. In combination, a brush of finely divided material consolidated into a malleable condition, and having an opening extending through the brush, said opening being closer to one side face of the brush than the opposite face, a flexible conductor extending into said opening, said conductor being retained in said opening by material of the brush which has been displaced from its original position adjacent said closer side face and forced into intimate contact with said conductor, and a pin extending through said flexible conductor and said displaced brush material.

In testimony whereof we have affixed our signatures to this specification.

JOHN F. KERLIN.
HENRY J. ROSENHOFFER.